(12) United States Patent
Sunda

(10) Patent No.: US 7,565,165 B2
(45) Date of Patent: Jul. 21, 2009

(54) TELEPHONE

(75) Inventor: Fumihiro Sunda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 598 days.

(21) Appl. No.: 11/275,725

(22) Filed: Jan. 25, 2006

(65) Prior Publication Data

US 2006/0172763 A1  Aug. 3, 2006

(30) Foreign Application Priority Data

Jan. 26, 2005 (JP) ............................. 2005-018694

(51) Int. Cl.
*H04M 1/00* (2006.01)
(52) U.S. Cl. ................... 455/550.1; 455/572; 455/573
(58) Field of Classification Search ............... 455/550.1, 455/572, 574, 573
See application file for complete search history.

(56) References Cited

U.S. PATENT DOCUMENTS

| | | | |
|---|---|---|---|
| 5,005,198 A | 4/1991 | Toda | |
| 5,838,140 A * | 11/1998 | Rosenthal | .................... 320/133 |
| 6,100,672 A * | 8/2000 | Siponen | ....................... 320/150 |
| 6,157,172 A * | 12/2000 | Niemitalo et al. | ........... 320/139 |
| 6,246,890 B1 | 6/2001 | Sato et al. | |
| 6,381,477 B1 | 4/2002 | Johnson, Jr. et al. | |
| 6,694,156 B2 * | 2/2004 | Seo | .......................... 455/574 |
| 2001/0009864 A1 * | 7/2001 | Seo | ............................. 455/574 |

FOREIGN PATENT DOCUMENTS

| | | |
|---|---|---|
| CN | 1175876 A | 3/1998 |
| EP | 0891065 A | 1/1999 |
| EP | 0891065 A1 | 1/1999 |
| JP | 215223 | 8/1997 |

OTHER PUBLICATIONS

European Search Report (mailed in European Patent Appl'n No. 06250443.6-2414—counterpart to the above-captioned patent application) mailed Apr. 13, 2006.
European Search Report for EP Appl'n No. 06 25 0443 (counterpart to U.S. Appl. No. 11/275,725) (2pgs) dated Apr. 6, 2006.
State Intellectual Property Office of PRC, Office Action (Chinese Patent Appl'n No. 2006100029715 (counterpart to above-captioned U.S. patent appl'n)), dated Aug. 31, 2007.

* cited by examiner

*Primary Examiner*—David Q Nguyen
(74) *Attorney, Agent, or Firm*—Baker Botts, LLP.

(57) ABSTRACT

A telephone including: a telephone main unit incorporating a battery and having: a standby state determination unit that determines whether or not the telephone main unit is in a standby state; a battery voltage detection unit that detects voltage across input and output sides of the battery; a voltage determination unit that determines, when the standby state determination unit determines that the telephone main unit is in the standby state, whether or not the detection voltage detected by the battery voltage detection unit exceeds a threshold voltage set based on a voltage when the battery is normally connected; and a warning unit that issues a warning to the effect that power cannot be supplied from the battery when the voltage determination unit determines that the detection voltage exceeds the threshold voltage; and a charger that supplies power to the battery.

6 Claims, 11 Drawing Sheets

AT DETECTION TIME
OF NO BATTERY

CHARGING DISPLAY
(WITH BATTERY)

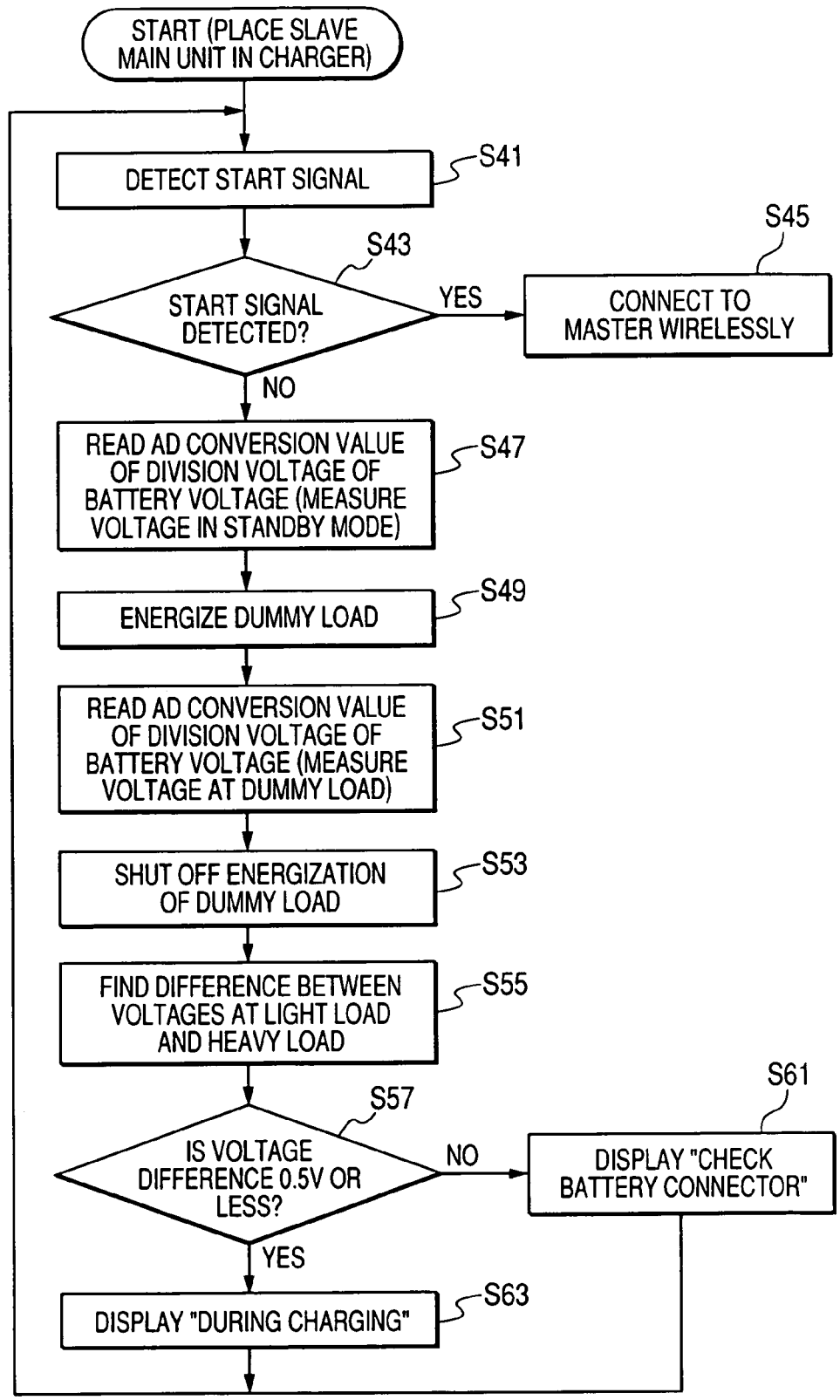

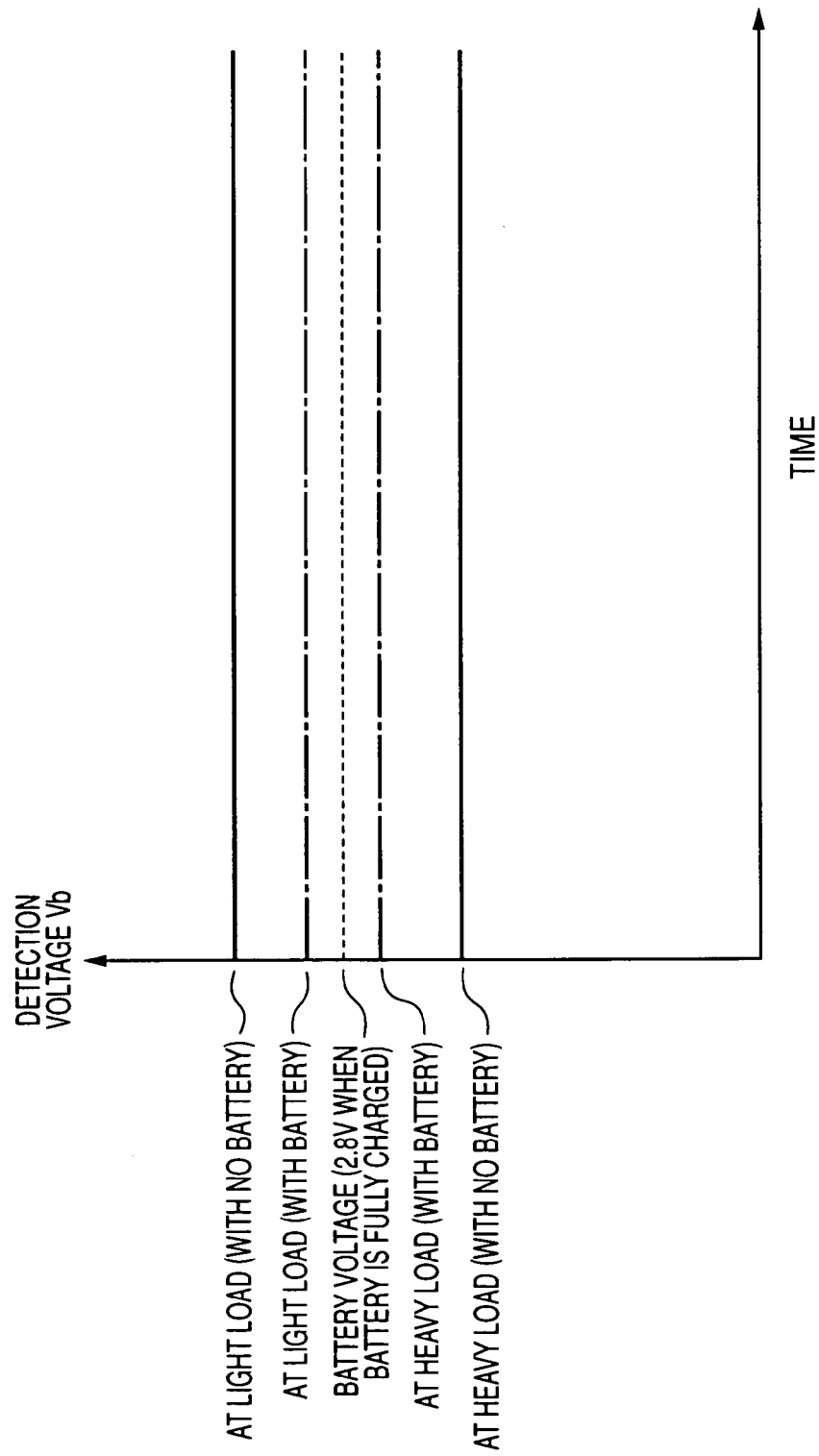

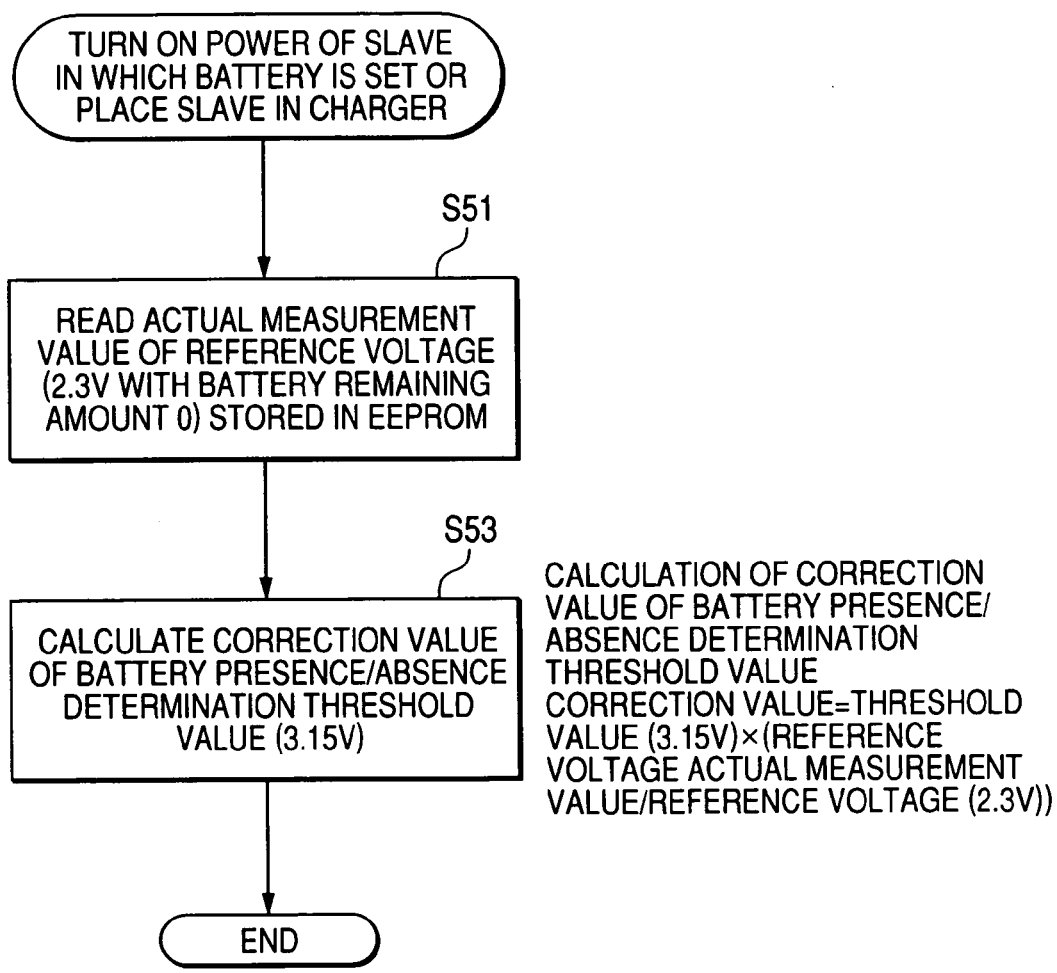

TELEPHONE

CROSS REFERENCE TO RELATED APPLICATION

This application claims priority from Japanese Patent Application No. 2005-018694, filed on Jan. 26, 2005, the entire subject matter of which is incorporated herein by reference.

TECHNICAL FIELD

Aspects of the present invention relate to a telephone having a telephone main unit incorporating a secondary battery and a charger for supplying power to the secondary battery and are applicable effectively to a slave of an extension telephone system.

BACKGROUND

A slave of an extension telephone system and a mobile telephone usually incorporate each a secondary battery that can be charged and discharged, and operate by receiving supply of power from the secondary battery. Thus, the slave and the mobile telephone need to be placed in a charger on a regular basis for charging the internal secondary battery.

For example, JP-A-9-215223 discloses that a switching element such as a transistor is placed between a secondary battery and a power supply section incorporated in a charger, the terminal voltage when the switching element is turned on/off is detected, and charging control is performed in response to the terminal voltage value, whereby the connection state of the secondary battery and the charger is detected.

SUMMARY

By the way, in the slave and the mobile telephone, when the slave is placed in the charger and can be charged, power is supplied not only from the internal secondary battery, but also from the charger and thus if the slave is in a state in which power cannot be supplied from the secondary battery, such as a state in which the secondary battery is not correctly connected to the slave or in which the secondary battery is not connected, the slave can notify the user of an incoming call from a master.

Thus, when the user who does not know the state in which power cannot be supplied from the secondary battery is aware of the incoming call from the master, and picks up the slave from the charger, the operation of the slave stops at the point in time and telephone conversation is shut off. Since the user does not know the state in which power cannot be supplied from the secondary battery, it is probable that the user may misunderstand that the slave, etc., fails at the point in time when the operation of the slave stops.

On the other hand, according to JP-A-9-215223, the connection state of the secondary battery and the charger is detected based on the terminal voltage value when the switching element is turned on/off; however, this technique assumes the case where the secondary battery is directly connected to the charger. Thus, a connection failure of the secondary battery incorporated in the slave or the like cannot be detected.

Aspects of the invention prevent the user from picking up a telephone main unit such as a slave from a charger without knowing the state in which power cannot be supplied from a secondary battery.

According to an aspect of the invention, there is provided a telephone including a telephone main unit incorporating a battery, the telephone main unit having: a standby state determination unit that determines whether or not the telephone main unit is in a chargeable state and is in a standby state; a battery voltage detection unit that detects voltage across input and output sides of the battery; a voltage determination unit that determines, when the standby state determination unit determines that the telephone main unit is in the standby state, whether or not the detection voltage detected by the battery voltage detection unit exceeds a threshold voltage set based on a voltage when the battery is normally connected; and a warning unit that issues a warning to the effect that power cannot be supplied from the battery when the voltage determination unit determines that the detection voltage exceeds the threshold voltage; and a charger that supplies power to the battery.

When the battery is normally connected, the current corresponding to the sum of operation current Ia required for operating the telephone main unit (see FIG. 4) and current Ibat for charging the battery (see FIG. 4) is supplied from the charger and in charging in the standby state, the appropriate current Ibat is supplied to the battery.

However, if a connection failure of the battery or the like occurs in the standby state, the current Ibat supplied to the battery becomes 0 and thus the voltage drop from the charger to the input and output sides of the battery becomes small as compared with the case where the battery is normally connected.

Thus, when it is determined that the standby state is entered, if the detection voltage detected by the battery voltage detection unit exceeds the threshold voltage defined based on the voltage when the battery is normally connected, it can be assumed that a connection failure of the battery or the like occurs.

Therefore, when the detection voltage exceeds the threshold voltage defined based on the voltage when the battery is normally connected, if a warning to the effect that power cannot be supplied from the battery is issued, the user can be prevented from picking up the telephone main unit from the charger without knowing the state in which power cannot be supplied from the battery. By extension, the problem such that the user misunderstands that the telephone main unit fails can be prevented from occurring.

According to another aspect of the invention, there is provided a telephone including a telephone main unit incorporating a battery, the telephone main unit having: a standby state determination unit that determines whether or not the telephone main unit is in a chargeable state and is in a standby state; a battery voltage detection unit that detects voltage across input and output sides of the battery; a power supply unit that supplies power when the standby state determination unit determines that the telephone main unit is in the standby state; a voltage determination unit that determines, when the standby state determination unit determines that the telephone main unit is in the standby state and when the power supply unit supplies power, whether or not the detection voltage detected by the battery voltage detection unit is less than a threshold voltage set based on a voltage when the battery is normally connected; and a warning unit that issues a warning to the effect that power cannot be supplied from the battery when the voltage determination unit determines that the detection voltage is less than the threshold voltage; and a charger for supplying power to the battery.

If the operation current Ia grows, when the battery is normally connected, the current increase is supplied from the battery; whereas, if power cannot be supplied from the battery, the current increase is all supplied from the charger. Thus, the voltage drop from the charger to the input and output sides of the battery in the state in which power cannot be supplied from the battery becomes large as compared with the voltage drop from the charger to the input and output sides of the battery when the battery is normally connected.

Thus, when the detection voltage when the power supply unit supplies power and the operation current Ia grows is less than the threshold voltage defined based on the voltage when the battery is normally connected, it can be assumed that a state in which power cannot be supplied from the battery is entered.

Therefore, when the detection voltage is less than the threshold voltage, if a warning to the effect that power cannot be supplied from the battery is issued, the user can be prevented from picking up the telephone main unit from the charger without knowing the state in which power cannot be supplied from the battery. By extension, the problem such that the user misunderstands that the telephone main unit fails can be prevented from occurring.

According to still another aspect of the inventions there is provided a telephone including a telephone main unit incorporating a battery, the telephone main unit having: a standby state determination unit that determines whether or not the telephone main unit is in a chargeable state and is in a standby state; a battery voltage detection unit that detects voltage across input and output sides of the battery; a power supply unit that supplies power when the standby state determination unit determines that the telephone main unit is in the standby state; a voltage determination unit that determines whether or not an absolute value of a voltage difference between a first detection voltage, detected by the battery voltage detection unit when the standby state determination unit determines that the telephone main unit is in the standby state, and a second detection voltage, detected by the battery voltage detection unit when the standby state determination unit determines that the telephone main unit is in the standby state and when the power supply unit supplies power, exceeds a threshold voltage set based on a voltage when the battery is normally connected; and a warning unit that issues a warning to the effect that power cannot be supplied from the battery when the voltage determination unit determines that the detection voltage exceeds the threshold voltage; and a charger for supplying power to the battery.

Accordingly, the telephone includes the means for detecting that a state in which power cannot be supplied from the battery is entered, and the means for detecting that a state in which power cannot be supplied from the battery is entered, so that it can be detected more precisely that a state in which power cannot be supplied from the battery is entered.

Therefore, the user can be more reliably prevented from picking up the telephone main unit from the charger without knowing the state in which power cannot be supplied from the battery.

BRIEF DESCRIPTION OF THE DRAWINGS

Illustrative aspects of the invention may be more readily described with reference to the accompanying drawings:

FIG. 9 is a flowchart to show control of a slave main unit according to a third aspect of the invention;

FIG. 10 is a chart to show detection voltages; and

FIG. 11 is a flowchart to show control of a slave main unit according to a fourth aspect of the invention.

DETAILED DESCRIPTION

Referring now to the accompanying drawings, aspects of the invention will be described.

(First Aspect)

Figure 1:
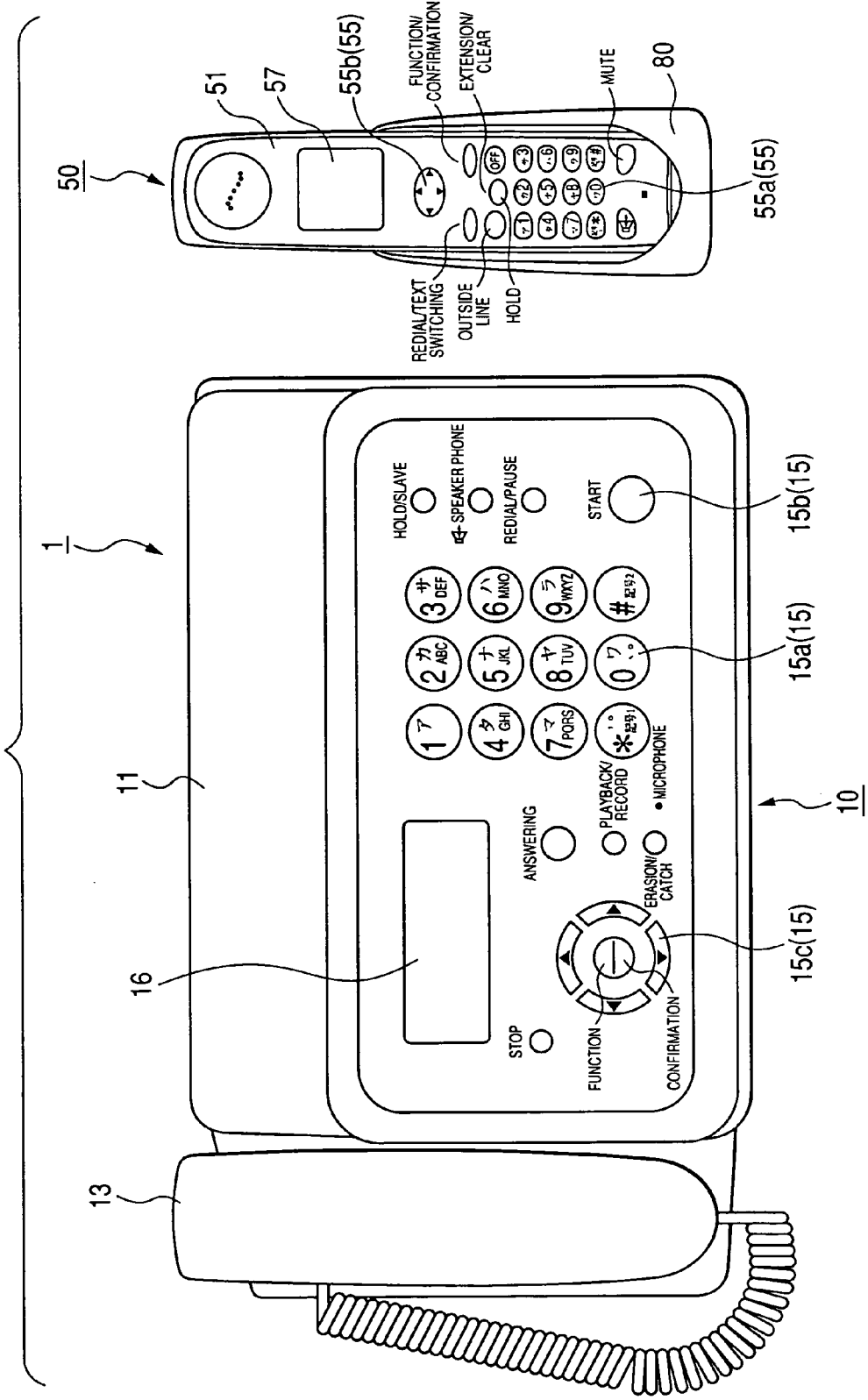
FIG. 1 is a front view of a cordless extension telephone system according to a first aspect of the invention.

In a first aspect of the invention, a telephone according to the invention is applied to a slave of an extension telephone system. FIG. 1 is a front view to represent the external configuration of a cordless extension telephone system 1.

As shown in FIG. 1, the cordless extension telephone system 1 is made up of a master 10 connected to a public telephone network 100 (see FIG. 2), a slave 50 made up of a slave main unit 51 for communicating with the master 10 over a wireless channel and a charger 80 for supplying power to (charging) a secondary battery 59 (see FIG. 3) incorporated in the slave main unit 51, and the like.

The master 10 is provided with a handset 13 connected to a master main unit 11 by a cable, various operation keys 15 such as numeric keys 15a for entering a telephone number, etc., a start key 15b, and a selection key 15c, a display panel 16 for displaying information relevant to various functions, and the like. The handset 13 is made up of a loudspeaker for playing back a transmitted sound (voice) signal, a microphone for picking up voice (sound) produced by a speaker, and the like in one piece.

The slave 50 also has almost similar functions to those of the master 10 and the slave main unit 51 almost shaped like the handset 13 is provided with various operation keys 55 such as numeric keys 55a for entering a telephone number, etc., and a selection key 55b and a display panel 57 for displaying information relevant to various functions, and the like.

The master 10 (master main unit 11) and the slave 50 (slave main unit 51) transmit and receive various signals including sound (voice) signals by conducting wireless communications with each other, whereby extension conversation between the master 10 and the slave 50, outside line conversation using the slave 50 through the master 10, and the like are made possible.

Next, the electric configuration of the cordless extension telephone system 1 will be described.

Figure 2:
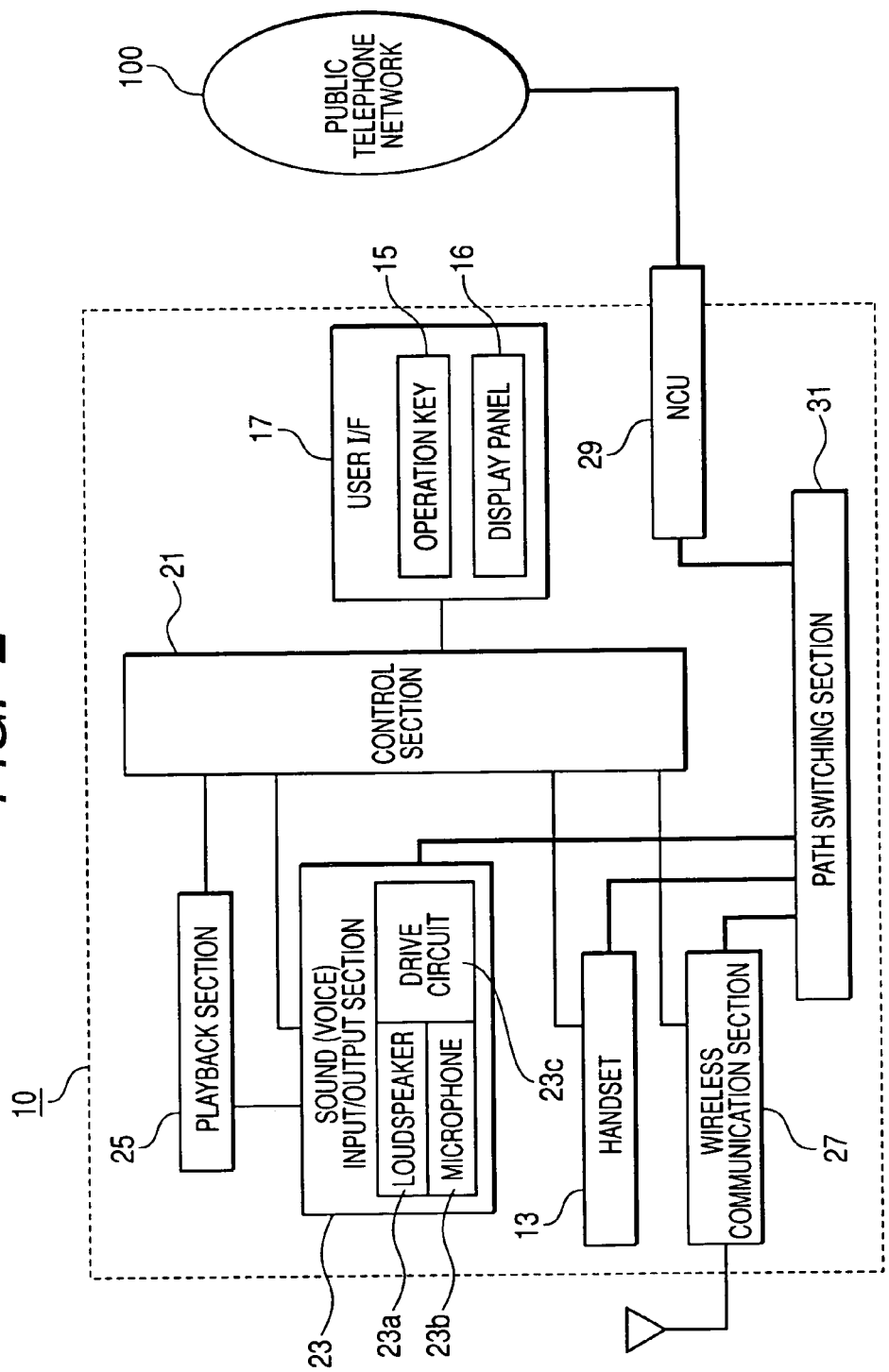
FIG. 2 is an electric system block diagram of a master according to the first aspect of the invention.

FIG. 2 is a block diagram to show the electric configuration of the master 10. A control section (CPU) 21 is a controller for controlling the operation of the master 10. The master 10 is made up of a handset 13, a user interface section 17 (user I/F 17) made up of operation keys 15 and a display panel 16, a sound (voice) input/output section 23 for inputting and outputting a sound (voice) signal, a playback section 25 for playing back sound (voice) based on various sound (voice) signals previously stored, a wireless communication section 27 for transmitting and receiving various signals to and from the slave 50 (slave main unit 51) by conducting wireless communications, an NCU (network control unit) 29 for inputting/outputting a sound (voice) signal transmitted via the public telephone network 100, a path switching section 31 for switching a sound (voice) signal transmission path in the master 10, and the like in addition to the control section 21.

The sound (voice) input/output section 23 is made up of a loudspeaker 23a and a microphone 23b for telephone conversation and a drive circuit 23c and includes not only a function as a usual receiver for outputting sound (voice) based on a sound (voice) signal, but also a hand-free conversation function for causing the loudspeaker 23a and the microphone 23b to function as a handset.

The playback section 25 previously stores sound (voice) signals of a ringing tone used when the telephone is called, a holding tone used to hold voice telephone conversation, and the like and plays back stored sound (voice) signal upon reception of a command from the control section 21.

The path switching section 31 switches the transmission path used for inputting/outputting a sound (voice) signal when the user operates the telephone to start telephone conversation to any of the handset 13, the sound (voice) input/output section 23, or the wireless communication section 27. Specifically, the path switching section 31 switches the transmission path to the handset 13 if the handset 13 is picked up from the master 10 main unit; switches the transmission path to the sound (voice) input/output section 23 if the user operates the telephone to start hand-free telephone conversation by pressing the operation key 15 of the user I/F 17; and switches the transmission path to the wireless communication section 27 if the user performs operation to start telephone conversation using the slave 50.

Figure 3:
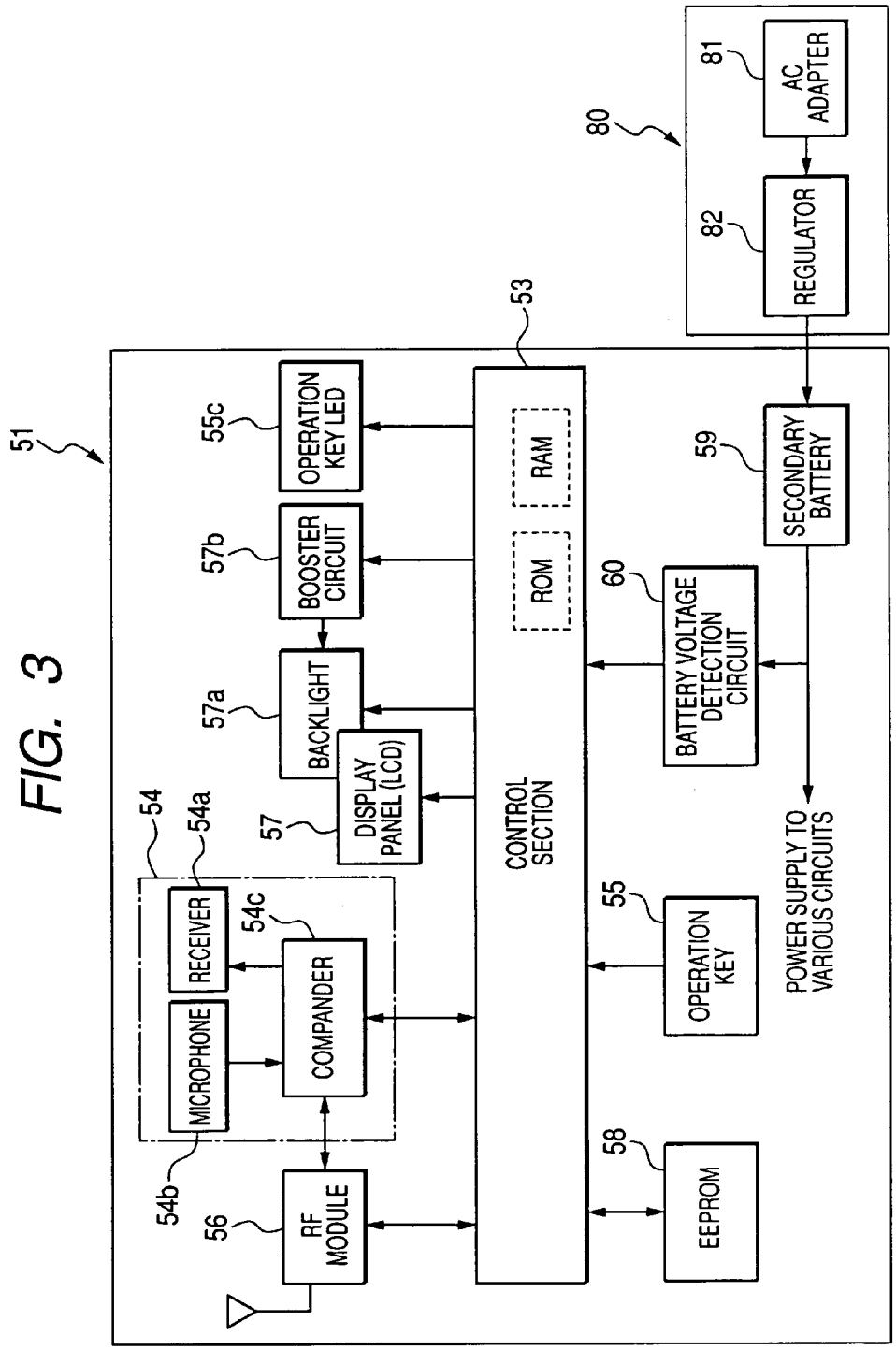
FIG. 3 is an electric system block diagram of a slave according to the first aspect of the invention.
Figure 4:
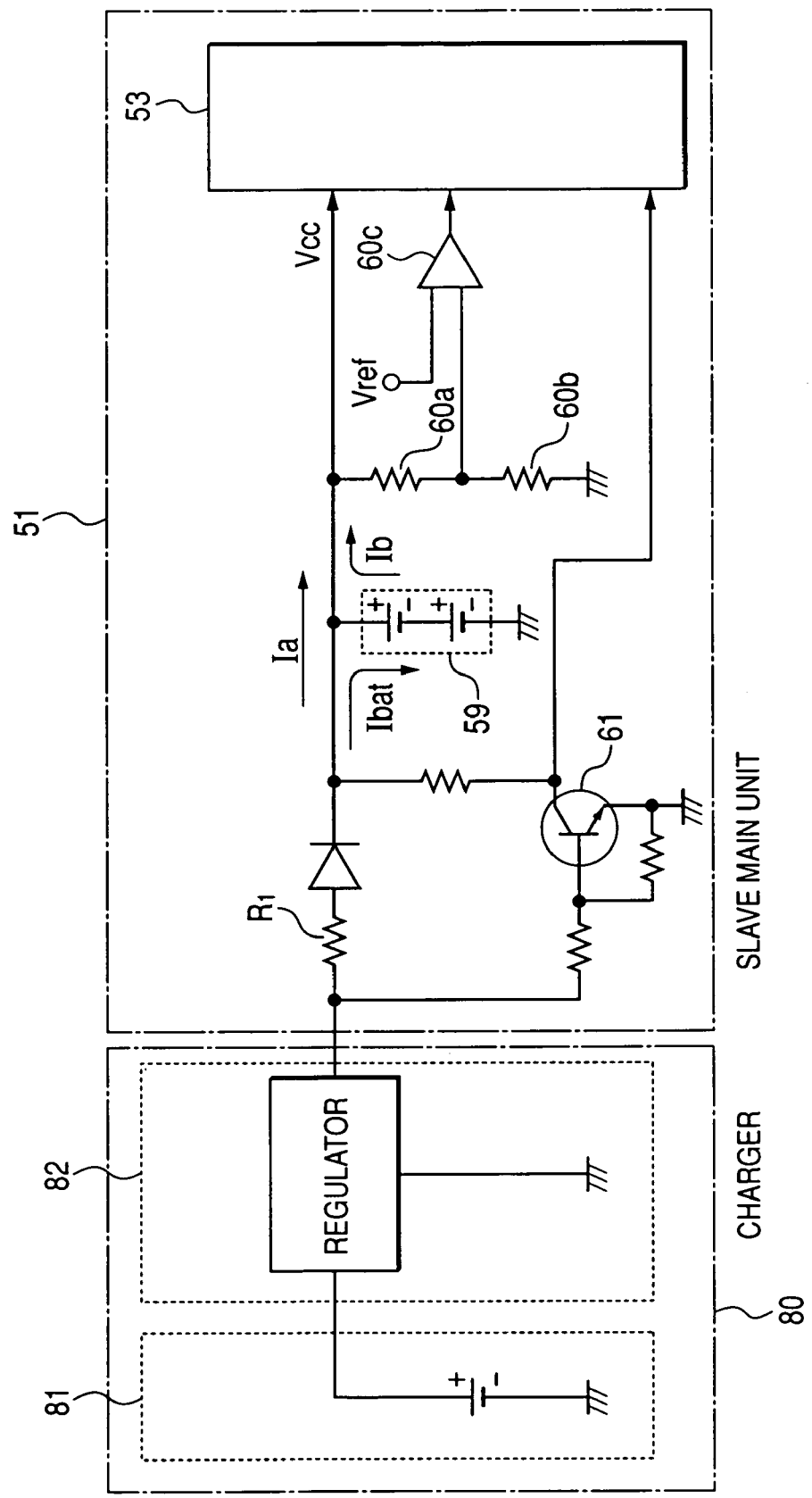
FIG. 4 is an electric circuit diagram of the slave according to the first aspect of the invention.

FIG. 2 is a block diagram to show the electric configuration of the slave 50 and FIG. 4 is a circuit diagram to schematically show the electric circuit of the slave 50. In FIG. 3, a control section (CPU) 53 is a controller for controlling the operation of various circuits, etc., incorporated in the slave main unit 51 and is implemented as a known microcomputer incorporating ROM, RAM, etc. Programs, etc., executed by the control section 53 are stored in the ROM of the control section 53.

Specifically, the control section 53 controls the operation of a receiver-transmitter section 54, the operation keys 55 such as the numeric keys 55a (see FIG. 1) and the selection key 55b (see FIG. 1), a wireless communication section (RF module) 56 for transmitting and receiving various signals including sound (voice) signals to and from the wireless communication section 27 of the master 10 by conducting wireless communications, the display panel 57, a storage device (EEPROM) 58 storing setup information of the slave main unit 51 and data of a telephone directory, etc., the secondary battery 59 that can be charged and discharged for supplying power to the various circuits of the control section 53, etc., a battery voltage detection circuit 60 for detecting the voltage across the input and output sides of the secondary battery 59, and the like.

The receiver-transmitter section 54 is made up of a compander (wireless compression and decompression circuit) 54c for modulating a sound (voice) signal transmitted to a telephone conversation loudspeaker 54a and a sound (voice) signal picked up by a microphone 54b to a format suited for wireless communications and the like.

The control section 53 also controls a backlight 57a for illuminating a display panel 57 implemented as a liquid crystal panel (LCD) from the rear, a booster circuit 57b for raising the voltage supplied to the backlight 57a to a predetermined voltage, and a light emitting diode (LED) 55c for illuminating the operation keys 55.

The charger 80 is made up of an AC adapter 81 for converting AC power into DC power while transforming the power supplied from an external power source such as 100-V power supply to a predetermined voltage, a regulator 82 for stabilizing the power supplied from the AC adapter 81, and the like.

Figure 6A:
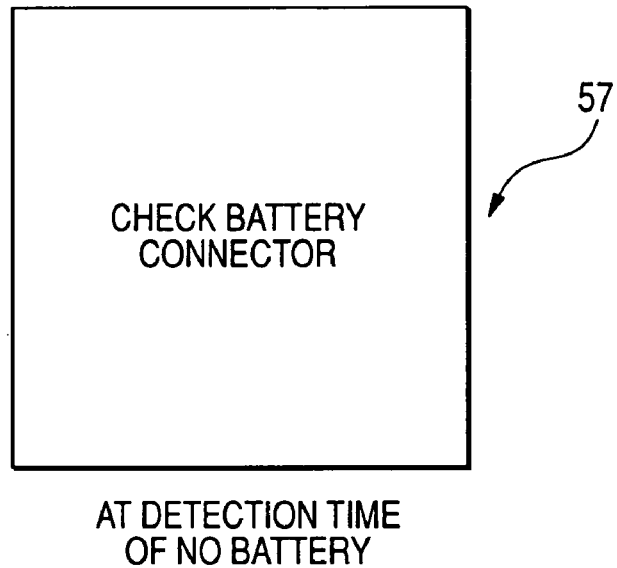
FIGS. 6A and 6B are drawings to show the display produced on a display panel of the slave main unit according to the first aspect of the invention.
Figure 6B:
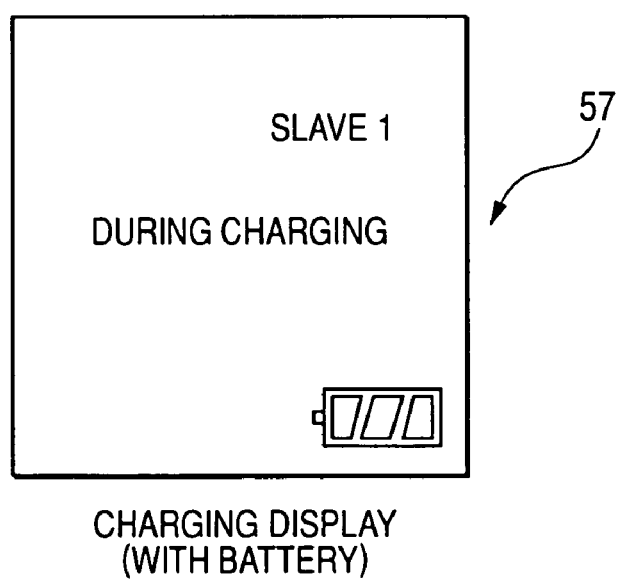

In the aspect, the battery voltage detection circuit 60 implementing a battery voltage detection unit is made up of resistors 60a and 60b and an AD converter 60c as shown in FIG. 4, and the AD converter 60c outputs a digital signal corresponding to the voltage across the input and output sides of the secondary battery 59. The remaining power amount of the secondary battery 59 corresponding to the voltage across the input and output sides of the secondary battery 59 is displayed on the display panel 57 (see FIG. 6B).

A placement switching element 61 is a transistor implementing a placement state detection unit for detecting whether or not the slave main unit 51 is placed in the charger 80. When the slave main unit 51 is placed in the charger 80 and energization is made possible, the placement switching element 61 is turned on and an on signal is input to the control section 53.

When the control section 53 detects the state of the slave main unit 51 and, for example, if a start signal from the master 10 is received or the operation key 55 is operated, the control section 53 reads the program responsive to the start signal or operation of the operation key 55 from the ROM of the control section 53, and controls the operation of the various circuits in accordance with the read program.

Next, the control operation concerning the determination as to whether or not a state in which power cannot be supplied from the secondary battery 59 to the control section 53, etc., is entered will be described.

Figure 5:
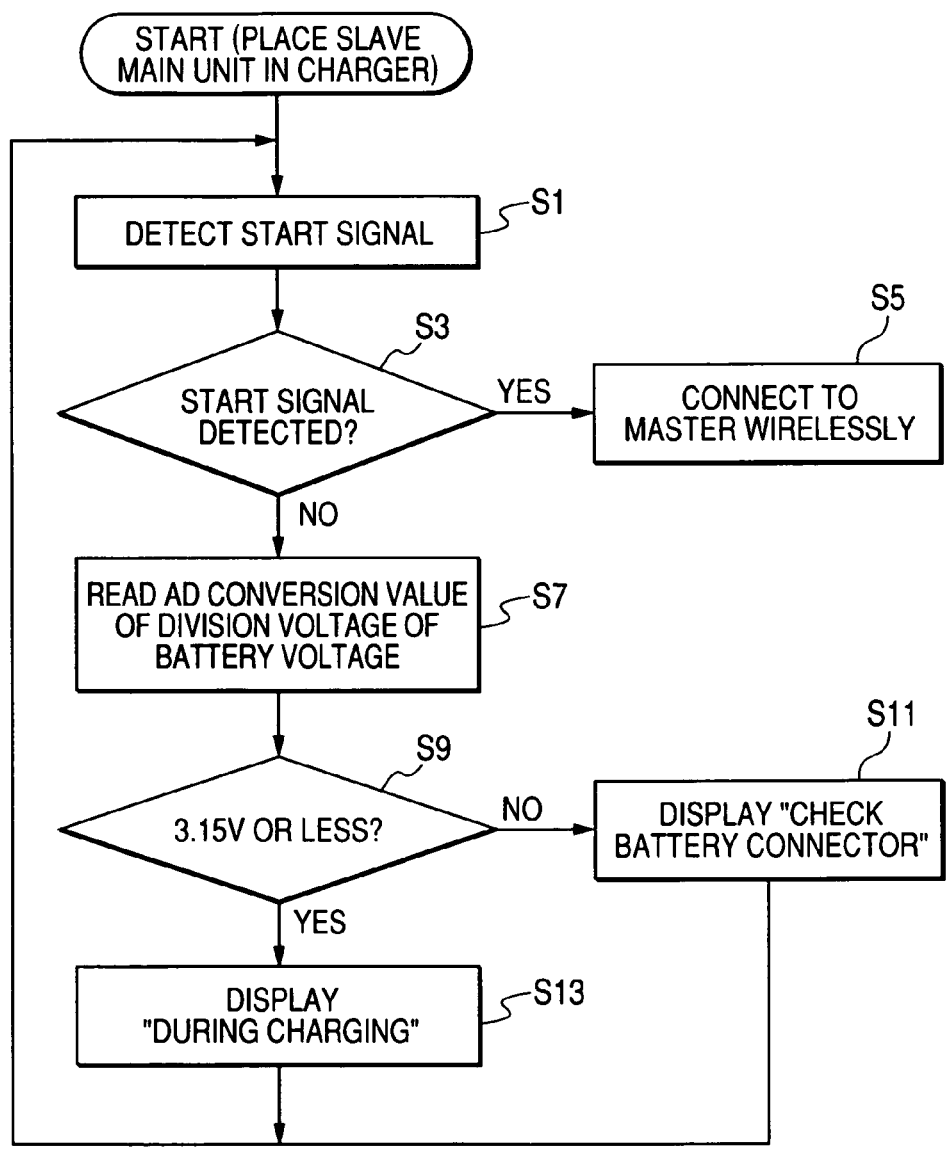
FIG. 5 is a flowchart to show control of a slave main unit according to the first aspect of the invention.

FIG. 5 is a flowchart to schematically show a control flow executed in the slave main unit 51 (control section 53) according to the aspect. When the slave main unit 51 is placed in the charger 80 and can be energized, namely, an on signal is input from the placement switching element 61 to the control section 53, the flowchart is executed and the control section 53 receives power supply from the charger 80 and operates.

When the flowchart is started, first a start signal is detected (S1). Here, the start signal refers to a ringing signal from the master 10 to the slave main unit 51 or an operation signal of the operation key 55 of the slave main unit 51.

Next, whether or not the start signal is detected, namely, the presence or absence of the ringing signal from the master 10 to the slave main unit 51 and the presence or absence of the operation signal of the operation key 55 of the slave main unit 51 are determined (S3). If at least one of the ringing signal from the master 10 to the slave main unit 51 and the operation signal of the operation key 55 of the slave main unit 51 is detected (YES at S3), the master 10 and the slave main unit 51 are connected through wireless communications (S5).

On the other hand, if neither the ringing signal from the master 10 to the slave main unit 51 nor the operation signal of the operation key 55 of the slave main unit 51 is detected (NO at S3), the AD conversion value of division voltage of battery voltage, namely, detection voltage value Vb of the battery voltage detection circuit 60 is read (S7).

Next, whether or not the detection voltage value Vb read at S7 is equal to or less than a predetermined threshold voltage Vs is determined (S9).

Here, the threshold voltage Vs is a voltage predetermined based on the voltage when the secondary battery 59 is normally connected to the slave main unit 51 according to the aspect. In the aspect, the battery voltage when the secondary battery 59 is fully charged is about 2.8 V and therefore the threshold voltage Vs is set to 3.15 V considering the internal resistance in the secondary battery 59, etc.

When the detection voltage value Vb is not equal to or less than the predetermined threshold voltage Vs, namely, if the detection voltage value Vb exceeds the predetermined threshold voltage Vs (NO at S9), a warning to the effect that power cannot be supplied from the secondary battery 59 (see FIG. 6A) is displayed on the display panel 57 (S11).

On the other hand, when the detection voltage value Vb is equal to or less than the predetermined threshold voltage Vs, namely, if the detection voltage value Vb does not exceed the predetermined threshold voltage Vs (YES at S9), a message indicating that the secondary battery 59 is being charged (see FIG. 6B) is displayed on the display panel 57 (S13).

As is obvious from the description of the control flow, S3 functions as a standby state determination unit that determines whether or not the telephone main unit is in a standby state waiting for an incoming call. S11 functions as a warning unit that issues a warning to the effect that power cannot be supplied from the secondary battery.

Next, the features of the slave 50 according to the aspect will be described.

When the secondary battery 59 is normally connected, the current corresponding to the sum of operation current Ia required for operating the slave main unit 51 and current Ibat for charging the secondary battery 59 is supplied from the charger 80 to the slave main unit 51, as shown in FIG. 4.

Further, when the slave main unit 51 is in a standby state, namely, when the slave main unit 51 is placed in the charger 80 and neither the ringing signal from the master 10 to the slave main unit 51 nor the operation signal of the operation key 55 of the slave main unit 51 is detected, the magnitude of a resistor R1 is defined so as to supply the appropriate current Ibat to the secondary battery 59 in charging thereof.

That is, in the aspect, when a predetermined voltage (for example, 100 V) is applied to the charger 80 with the slave main unit 51 in the standby state, the magnitude of the resistor R1 is set so that the voltage across the input and output sides of the secondary battery 59 becomes 3.15 V.

Thus, if power cannot be supplied from the secondary battery 59 to the control section 53, etc., in the standby state, the current Ibat supplied to the secondary battery 59 becomes 0 and therefore the voltage drop from the charger 80 to the input and output sides of the secondary battery 59 becomes small as compared with the case where the secondary battery 59 is normally connected.

Therefore, when it is determined that the standby state is entered, namely, when NO is returned at S3, if the detection voltage value Vb exceeds the threshold voltage Vs, it can be assumed that power is not supplied from the secondary battery 59 to the control section 53, etc.

Then, in the aspect, if the detection voltage value Vb exceeds the threshold voltage Vs, namely, if the detection voltage value Vb is more than the threshold voltage Vs, a warning to the effect that power cannot be supplied from the secondary battery 59 is displayed on the display panel 57, thereby preventing the user from picking up the slave main unit 51 from the charger 80 without knowing the state in which power cannot be supplied from the secondary battery 59. Therefore, in the aspect, the problem such that the user misunderstands that the slave main unit 51 fails can be prevented from occurring.

The battery voltage detection unit for detecting the remaining power amount of the secondary battery 59 is also used as the battery voltage detection unit for determining whether or not the secondary battery 59 is normally connected to the slave main unit 51, so that an increase in the number of parts and the number of manufacturing steps of the slave main unit 51 can be suppressed and a rise in the manufacturing cost of the cordless extension telephone system 1 can be suppressed.

(Second Aspect)

In the first aspect, whether or not the secondary battery 59 is normally connected to the slave main unit 51 is detected using a phenomenon in which if power consumption of the slave main unit 51 is small, for example, when the slave main unit 51 is in the standby state (such a case will be hereinafter referred to as "light load"), the voltage across the input and output sides of the secondary battery 59 rises as compared with the voltage when the secondary battery 59 is normally connected to the slave main unit 51. In a second aspect of the invention, whether or not a secondary battery 59 is normally connected to a slave main unit 51 is detected using a phenomenon in which if power consumption of the slave main unit 51 grows as compared with the light load state (such a case will be hereinafter referred to as "heavy load"), the voltage across the input and output sides of the secondary battery 59 drops as compared with the voltage when the secondary battery 59 is normally connected to the slave main unit 51. The aspect will be described below in detail.

Figure 7:
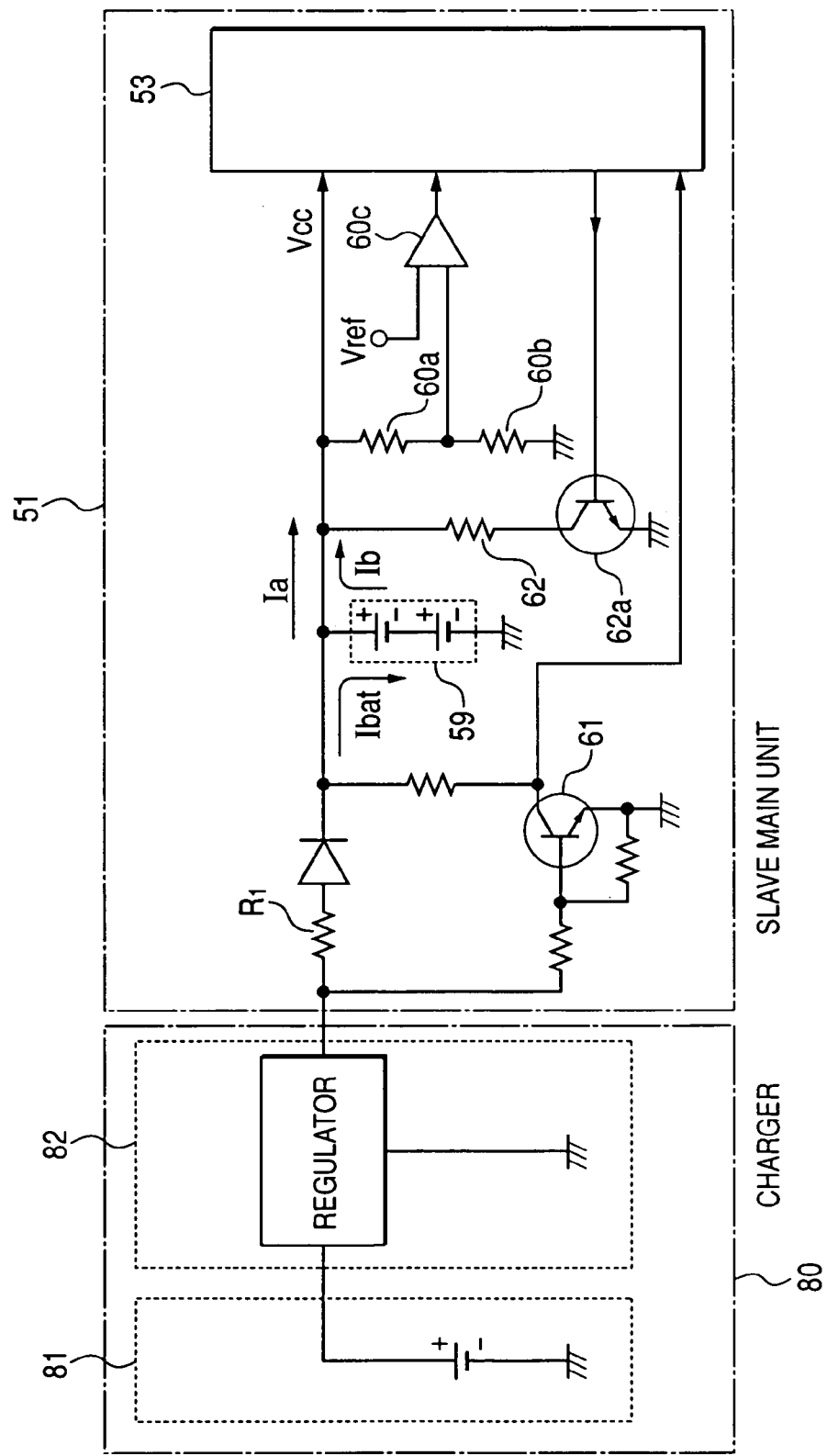
FIG. 7 is an electric circuit diagram of a slave according to a second aspect of the invention.

FIG. 7 is a circuit diagram to schematically show the electric circuit of a slave 50 in the aspect. In the aspect, a dummy resistor 62 not directly relating to telephone conversation operation, etc., of the slave 50 is provided on the output of the secondary battery 59 and to detect whether or not the secondary battery 59 is normally connected to the slave main unit 51, the dummy resistor 62 is energized, thereby creating a heavy load state.

A switching element 62a is a transistor for switching between supply of power to the dummy resistor 62 connected to the output of the secondary battery 59 and no supply of power to the dummy resistor 62; a control section 53 controls the switching element 62a, thereby switching between energizing the dummy resistor 62 and no energizing the dummy resistor 62.

The electric configuration of the second aspect is similar to that of the first aspect except that the dummy resistor 62 and the switching element 62a are provided and therefore functional parts identical with those of the first aspect are denoted by the same reference numerals in the second aspect and will not be described again.

Next, the control operation concerning the determination as to whether or not a state in which power cannot be supplied from the secondary battery 59 to the control section 53, etc., is entered in the second aspect will be described.

Figure 8:
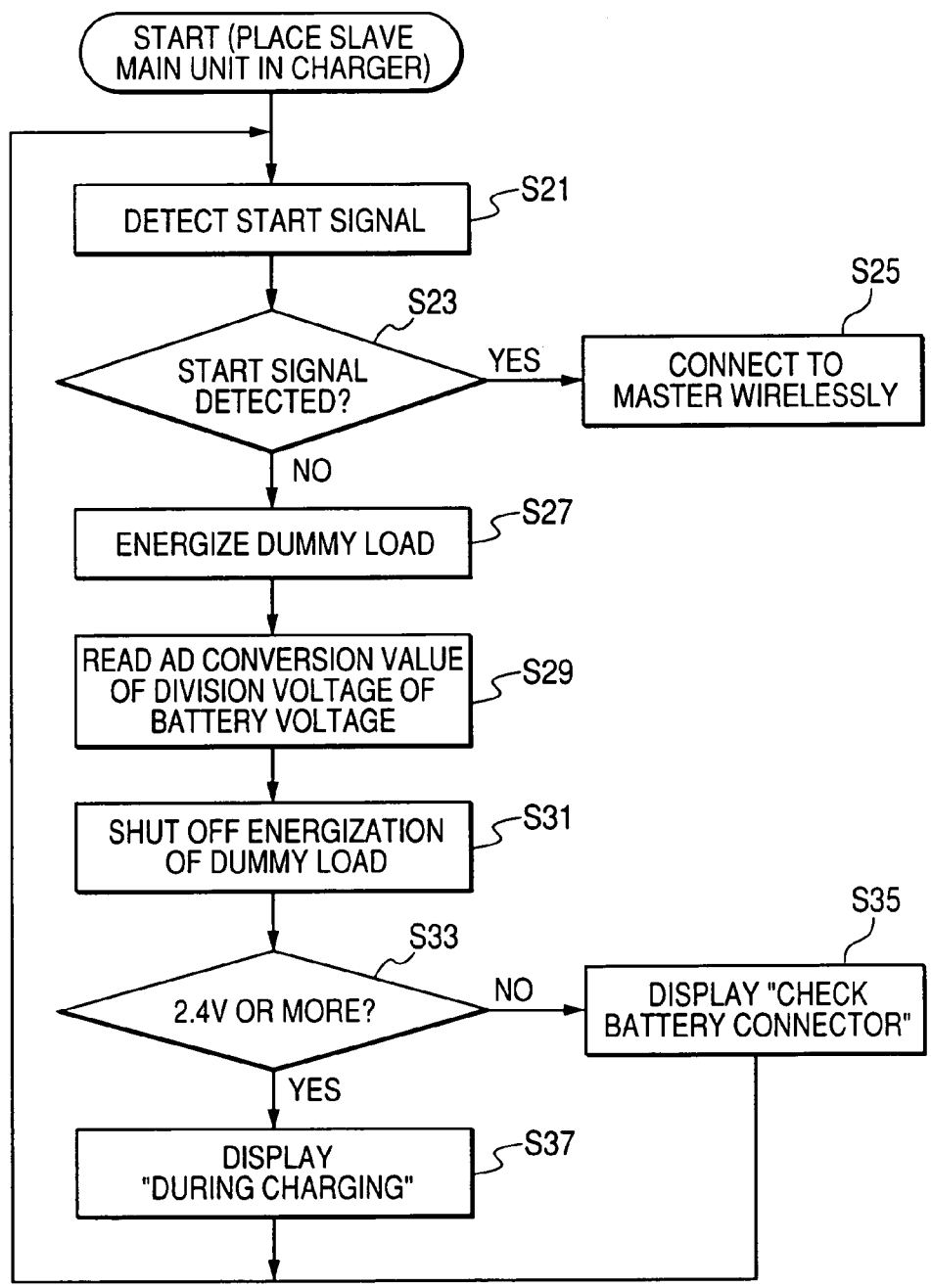
FIG. 8 is a flowchart to show control of a slave main unit according to the second aspect of the invention.

FIG. 8 is a flowchart to schematically show a control flow executed in the slave main unit 51 (control section 53) according to the aspect. When the slave main unit 51 is placed in a charger 80 and can be energized, the flowchart is executed and the control section 53 receives power supply from the charger 80 and operates as with the first aspect.

When the control shown in the flowchart is started, first a start signal is detected (S21). The start signal refers to a ringing signal from a master 10 to the slave main unit 51 or an operation signal of an operation key 55 of the slave main unit 51 as with the first aspect.

Next, whether or not the start signal is detected, namely, the presence or absence of the ringing signal from the master 10 to the slave main unit 51 and the presence or absence of the operation signal of the operation key 55 of the slave main unit 51 are determined (S23). If at least one of the ringing signal from the master 10 to the slave main unit 51 and the operation signal of the operation key 55 of the slave main unit 51 is detected (YES at S23), the master 10 and the slave main unit 51 are connected through wireless communications (S25).

On the other hand, if neither the ringing signal from the master 10 to the slave main unit 51 nor the operation signal of the operation key 55 of the slave main unit 51 is detected (NO at S23), the dummy resistor 62 is energized (S27) and the power consumption on the output of the secondary battery 59 is increased for creating a heavy load state and then the AD conversion value of division voltage of battery voltage, namely, detection voltage value Vb of a battery voltage detection circuit 60 is read (S29).

When the secondary battery 59 is normally connected, power supplied to the dummy resistor 62 is supplied from the secondary battery 59 and the charger 80; on the other hand, when the secondary battery 59 is not normally connected power to the dummy resistor 62 is supplied from the charger 80.

When the detection voltage value Vb of the battery voltage detection circuit 60 is read (S29), energization of the dummy resistor 62 is shut off (S31) and whether or not the detection voltage value Vb read at S29 is equal to or less than a predetermined threshold voltage Vs is determined (S33).

Here, the threshold voltage Vs is a voltage predetermined based on the voltage when the secondary battery 59 is normally connected to the slave main unit 51 according to the aspect. In the aspect, the battery voltage when the secondary battery 59 is fully charged is about 2.8 V and operation current Ia grows for increasing voltage drop as described later and therefore the threshold voltage Vs is set to 2.4 V.

If the detection voltage value Vb is not equal to or greater than the predetermined threshold voltage Vs, namely, if the detection voltage value Vb is less than the predetermined threshold voltage Vs (NO at S33), a warning to the effect that power cannot be supplied from the secondary battery 59 (see FIG. 6A) is displayed on a display panel 57 (S35).

On the other hand, if the detection voltage value Vb is equal to or greater than the predetermined threshold voltage Vs, namely, if the detection voltage value Vb is not less than the predetermined threshold voltage Vs (YES at S33), a message indicating that the secondary battery 59 is being charged (see FIG. 6B) is displayed on the display panel 57 (S37).

As is obvious from the description of the control flow, S23 functions as a standby state determination unit that determines whether or not the telephone main unit is in a standby state waiting for an incoming call. S27 functions as a power supply unit that supplies power when the standby state determination unit determines that the telephone main unit is in the standby state. S35 functions as a warning unit that issuing a warning to the effect that power cannot be supplied from the secondary battery.

Next, the features of the slave 50 according to the aspect will be described.

When the slave main unit 51 is in a standby state, namely, when the slave main unit 51 is placed in the charger 80 and neither the ringing signal from the master 10 to the slave main unit 51 nor the operation signal of the operation key 55 of the slave main unit 51 is detected, if the operation current Ia grows, when the secondary battery 59 is normally connected, the current increase is supplied from the secondary battery 59; whereas, if power cannot be supplied from the secondary battery 59, the current increase is all supplied from the charger 80.

Thus, the voltage drop from the charger 80 to the input and output sides of the secondary battery 59 in the state in which power cannot be supplied from the secondary battery 59 becomes large as compared with the voltage drop from the charger 80 to the input and output sides of the secondary battery 59 when the secondary battery 59 is normally connected.

Then, in this aspect, when the slave main unit 51 is in the standby state, the dummy resistor 62 is energized, thereby creating a heavy load state, namely, a state in which the operation current Ia grows and whether or not the detection voltage value Vb in the created heavy load state is less than the threshold voltage Vs determined based on the voltage when the secondary battery 59 is normally connected is determined, whereby whether or not the telephone (slave) enters the state in which power cannot be supplied from the secondary battery 59, namely, a state in which a connection failure of the secondary battery 59 occurs or the secondary battery 59 is not connected is determined.

Then, in the aspect, if it is determined that the detection voltage value Vb is less than the threshold voltage Vs, a warning to the effect that power cannot be supplied from the secondary battery 59 is displayed on the display panel 57, thereby preventing the user from picking up the slave main unit 51 from the charger 80 without knowing the state in which power cannot be supplied from the secondary battery 59. Therefore, also in the aspect, the problem such that the user misunderstands that the slave main unit 51 fails can be prevented from occurring.

In the aspect, the dummy resistor 62 is provided as the dedicated part to create the heavy load state, but the aspect is not limited to it. The dummy resistor 62 may be removed and to create the heavy load state, a component usually possessed by the slave main unit 51 (for example, a backlight 57a, an LED 55c for illuminating the operation key, or the like) may be energized.

(Third Aspect)

In the aspects described above, the voltage across the input and output sides of the secondary battery 59 is detected in the light load state or the heavy load state and a comparison is made between the detection voltage value Vb and the threshold voltage Vs for the greater-than, equal-to, or less-than relation therebetween, whereby whether or not power can be supplied from the secondary battery 59 is determined. In a third aspect of the invention, a comparison is made between the absolute value of voltage difference ΔVb between detection voltage value Vb at a light load and detection voltage value Vb at a heavy load and preset threshold voltage difference ΔVs for the greater-than, equal-to, or less-than relation therebetween, whereby whether or not power can be supplied from a secondary battery 59 is determined. A slave 50 according to the third aspect will be described below in detail.

The slave 50 according to the aspect has a similar electric configuration to that of the slave 50 according to the second aspect (see FIG. 7); the third aspect differs from the first or second aspect only in a control flow for determining whether or not a state in which power cannot be supplied from the secondary battery 59 is entered. Then, the third aspect will be described based on the control flow for determining whether or not a state in which power cannot be supplied from the secondary battery 59 is entered (see FIG. 9).

FIG. 9 is a flowchart to schematically show a control flow executed in a slave main unit 51 (control section 53) according to the aspect. When the slave main unit 51 is placed in a charger 80 and can be energized, the flowchart is executed and the control section 53 receives power supply from the charger 80 and operates as with the first and second aspects.

When the control shown in the flowchart is started, first a start signal is detected (S41). The start signal refers to a ringing signal from a master 10 to the slave main unit 51 or an operation signal of an operation key 55 of the slave main unit 51 as with the first and second aspects.

Next, whether or not the start signal is detected, namely, the presence or absence of the ringing signal from the master 10 to the slave main unit S1 and the presence or absence of the operation signal of the operation key 55 of the slave main unit 51 are determined (S43). If at least one of the ringing signal from the master 10 to the slave main unit 51 and the operation signal of the operation key 55 of the slave main unit 51 is detected (YES at S43), the master 10 and the slave main unit 51 are connected through wireless communications (S45).

On the other hand, it neither the ringing signal from the master 10 to the slave main unit 51 nor the operation signal of the operation key 55 of the slave main unit 51 is detected (NO at S43), the AD conversion value of division voltage of battery voltage, namely, detection voltage value Vb of a battery voltage detection circuit 60 in a light load state is read (S47).

Next, a dummy resistor 62 is energized (S49) and the power consumption on the output of the secondary battery 59 is increased for creating a heavy load state and then detection voltage value Vb of the battery voltage detection circuit 60 is read (S51).

When the detection voltage value Vb of the battery voltage detection circuit 60 in the heavy load state is read (S51), energization of the dummy resistor 62 is shut off (S53) and the absolute value of voltage difference ΔVb between the detection voltage value Vb1 in the light load state read at S47 and the detection voltage value Vb2 in the heavy load state read at S51 (which will be hereinafter referred to simply as the voltage difference ΔVb) is calculated (S55).

Next, whether or not the voltage difference ΔVb is equal to or less than a predetermined threshold voltage difference ΔVs is determined (S57). Here, the threshold voltage difference ΔVs is a voltage difference predetermined based on the voltage in the light load state and the voltage in the heavy load state when the secondary battery 59 is normally connected to the slave main unit 51 according to the aspect. In the aspect, the battery voltage when the secondary battery 59 is fully charged is about 2.8 V and therefore the threshold voltage difference ΔVs is set to 0.5 V considering the resistance value of the dummy resistor 62, etc.

If the voltage difference ΔVb is not equal to or less than the predetermined threshold voltage difference ΔVs, namely, if the voltage difference ΔVb exceeds the predetermined threshold voltage difference ΔVs (NO at S57), a warning to the effect that power cannot be supplied from the secondary battery 59 (see FIG. 6A) is displayed on a display panel 57 (S61).

On the other hand, if the voltage difference ΔVb is equal to or less than the predetermined threshold voltage difference ΔVs, namely, if the voltage difference ΔVb does not exceed the predetermined threshold voltage difference ΔVs (YES at S57), a message indicating that the secondary battery 59 is being charged (see FIG. 6B) is displayed on the display panel 57 (S63)

As is obvious from the description of the control flow, S43 functions as a standby state determination unit that determines whether or not the telephone main unit is in a standby state waiting for an incoming call. S49 functions as a power supply unit that supplies power when the standby state determination unit determines that the telephone main unit is in the standby state. S61 functions as a warning unit that issues a warning to the effect that power cannot be supplied from the secondary battery.

Next, the features of the slave 50 according to the aspect will be described.

FIG. 10 shows the greater-than, equal-to, or less-than relation among the output voltage of the secondary battery 59 when the battery is fully charged, the detection voltage Vb at light load when the secondary battery 59 is normally connected, the detection voltage Vb at a light load when the secondary battery 59 is not connected, the detection voltage Vb at heavy load when the secondary battery 59 is normally connected, and the detection voltage Vb at a heavy load when the secondary battery 59 is not connected.

At the light load, the smaller operation current Ia, the larger the voltage difference between the output voltage of the secondary battery 59 when the battery is fully charged and the detection voltage Vb when the secondary battery 59 is not connected. On the other hand, at the heavy load, the larger the operation current Ia, the larger the voltage difference between the output voltage of the secondary battery 59 when the battery is fully charged and the detection voltage Vb when the secondary battery 59 is not connected.

Thus, if the operation current Ia becomes large at the light load or if it is difficult to increase the operation 6 current Ia at the heavy load, the voltage difference between the output voltage of the secondary battery 59 when the battery is fully charged and the detection voltage Vb when the secondary battery 59 is not connected becomes small and thus it becomes difficult to determine whether or not a state in which power cannot be supplied from the secondary battery 59 is entered.

On the other hand, in the aspect, a comparison is made between the absolute value of the voltage difference ΔVb between the detection voltage value Vb at the light load and the detection voltage value Vb at the heavy load and the preset threshold voltage difference ΔVs for the greater-than, equal-to, or less-than relation therebetween and therefore it can be the that the aspect is the determination unit provided by combining the means for detecting that a state in which power cannot be supplied from the secondary battery 59 is entered, shown in the first aspect and the means for detecting that a state in which power cannot be supplied from the secondary battery 59 is entered, shown in the second aspect.

Therefore, if the operation current Ia becomes large at the light load or if it is difficult to increase the operation current Ia at the heavy load, it can be detected more precisely that a state in which power cannot be supplied from the secondary battery 59 is entered.

(Fourth Aspect)

In the aspects described above, the threshold voltage Vs or the threshold voltage difference ΔVs (both will be hereinafter collectively referred to simply as the threshold voltage Vs) is the fixed value preset at the design development stage; in a fourth aspect of the invention, however, the threshold voltage Vs is corrected considering the individual difference (variations) from one slave main unit 51 to another.

Specifically, before the control flow for determining whether or not a state in which power cannot be supplied from the secondary battery 59 is entered (FIG. 5, 8, or 9) is started, namely, before S1 (see FIG. 5), S21 (see FIG. 8), or S41 (see FIG. 9) is executed, a program (job) for correcting the threshold voltage Vs is executed and after the threshold voltage Vs is corrected, the control flow for determining whether or not a state in which power cannot be supplied from the secondary battery 59 is entered (FIG. 5, 8, or 9) is executed using the post-corrected threshold voltage Vs.

FIG. 11 is a flowchart to schematically show the program for correcting the threshold voltage Vs. The correction job of the threshold voltage Vs will be discussed based on the flowchart.

When the slave main unit 51 is placed in a charger 80 or when power of the slave main unit 51 is turned on with a secondary battery 59 placed in the slave main unit 51, the correction job is executed. When the power of the slave main unit 51 is turned on with the secondary battery 59 placed in the slave main unit 51, the slave main unit 51 need not necessarily be placed in the charger 80.

When the correction job is started, first the actual measurement value of the battery voltage when the remaining power amount of the secondary battery 59 is 0 (which will be hereinafter referred to as the reference voltage actual measurement value) is read from a storage device (EEPROM) 58 (S51).

Here, the battery voltage when the remaining power amount of the secondary battery 59 is 0 means the voltage when the capacity of the secondary battery is exhausted, namely, the discharge final voltage; in the aspect, the discharge final voltage actually measured at the manufacturing stage is stored in the storage device 58 as the reference voltage actual measurement value. In this connection, the design value of the discharge final voltage of the secondary battery 59 according to the aspect (which will be hereinafter referred to as the reference voltage) is 2.3 V.

Next, the threshold voltage Vs is corrected based on the ratio between the reference voltage actual measurement value and the reference voltage (S53). The value resulting from multiplying the threshold voltage Vs preset based on the theoretical value (design value) by the ratio of the reference voltage actual measurement value to the reference voltage is stored as the post-corrected threshold voltage Vs in a storage device such as RAM. To later execute the control flow for determining whether or not a state in which power cannot be supplied from the secondary battery 59 is entered (FIG. 5, 8, or 9), the corrected threshold voltage Vs is used.

FIG. 11 schematically shows the correction job of the threshold voltage Vs in the first aspect; similarity holds true for other aspects.

Next, the features of a slave 50 according to the fourth aspect will be discussed.

In the aspect, the threshold voltage Vs is corrected based on the reference voltage actual measurement value and thus if a slight individual difference exists from one product to another, whether or not a state in which power cannot be supplied from the secondary battery 59 is entered can be detected reliably.

Since the aspect is characterized by the fact that the threshold voltage Vs is corrected based on the ratio between the reference voltage actual measurement value and the reference voltage, the value resulting from multiplying the threshold voltage Vs preset based on the theoretical value (design value) by the ratio of the reference voltage actual measurement value to the reference voltage is used as the correction calculation expression in the aspect, but the correction calculation expression is not limited to it.

(Other Aspects)

In the aspects described above, a nickel-cadmium battery is adopted as the secondary battery 59, but the invention is not limited to it.

In the aspects described above, the telephone according to the invention is applied to the slave of the extension telephone system, but the invention is not limited to it; for example, the telephone according to the invention can also be applied to a mobile telephone.

In the aspects described above, the battery voltage detection unit for detecting the remaining power amount of the secondary battery 59 and the battery voltage detection unit for determining whether or not the secondary battery 59 is normally connected to the slave main unit 51 are made single unit, but the invention is not limited to the mode; the battery voltage detection unit for detecting the remaining power amount of the secondary battery 59 and the battery voltage detection unit for determining whether or not the secondary battery 59 is normally connected to the slave main unit 51 may be provided separately.

In the aspects described above, the slave has the function of displaying the remaining power amount of the secondary battery 59, but the invention is not limited to the mode; the function of displaying the remaining power amount of the secondary battery 59 may be removed.

The invention may be constructed within its spirit and scope as set out in the claims and is not limited to the specific aspects described above.

What is claimed is:

1. A telephone comprising:
    a telephone main unit incorporating a battery; and
    a charger that supplies power to the telephone main unit and the battery,
    the telephone main unit comprising:
        a chargeable state determination unit that determines whether or not the telephone main unit is in a chargeable state in which the telephone main unit is supplied with power by the charger;
        a standby state determination unit that determines, when the chargeable state determination unit determines that the telephone main unit is in the chargeable state, whether or not the telephone main unit is in a standby state;
        a battery voltage detection unit that detects voltage across input and output sides of the battery;
        a voltage determination unit that determines, when the standby state determination unit determines that the telephone main unit is in the standby state, whether or not the voltage detected by the battery voltage detection unit exceeds a threshold voltage set based on a voltage when the battery is normally connected;
        a warning unit that issues a warning to the effect that power cannot be supplied from the battery when the voltage determination unit determines that the detected voltage exceeds the threshold voltage;
        a threshold voltage correction unit that corrects the threshold voltage; and
        a correction value storage unit that stores the corrected threshold voltage as the threshold voltage.

2. The telephone according to claim 1, wherein the telephone main unit further comprises a remaining amount display unit that displays a remaining power amount of the battery; and
    the remaining amount display unit displays the remaining power amount of the battery based on the voltage detected by the battery voltage detection unit.

3. A telephone comprising:
    a telephone main unit incorporating a battery; and
    a charger that supplies power to the telephone main unit and the battery,
    the telephone main unit comprising:
        a chargeable state determination unit that determines whether or not the telephone main unit is in a chargeable state in which the telephone main unit is supplied with power by the charger;
        a standby state determination unit that determines, when the chargeable state determination unit determines that the telephone main unit is in the chargeable state, whether or not the telephone main unit is in a standby state;
        a battery voltage detection unit that detects voltage across input and output sides of the battery;

a power supply unit that supplies power when the standby state determination unit determines that the telephone main unit is in the standby state;

a voltage determination unit that determines, when the standby state determination unit determines that the telephone main unit is in the standby state and when the power supply unit supplies power, whether or not the voltage detected by the battery voltage detection unit is less than a threshold voltage set based on a voltage when the battery is normally connected;

a warning unit that issues a warning to the effect that power cannot be supplied from the battery when the voltage determination unit determines that the detected voltage is less than the threshold voltage;

a threshold voltage correction unit that corrects the threshold voltage; and a correction value storage unit that stores the corrected threshold voltage as the threshold voltage.

4. The telephone according to claim 3, wherein the telephone main unit further comprises a remaining amount display unit that displays a remaining power amount of the battery; and the remaining amount display unit displays the remaining power amount of the battery based on the voltage detected by the battery voltage detection unit.

5. A telephone comprising:

a telephone main unit incorporating a battery; and a charger that supplies power to the telephone main unit and the battery, the telephone main unit comprising:

a chargeable state determination unit that determines whether or not the telephone main unit is in a chargeable state in which the telephone main unit is supplied with power by the charger;

a standby state determination unit that determines, when the chargeable state determination unit determines that the telephone main unit is in the chargeable state, whether or not the telephone main unit is in a standby state;

battery voltage detection unit that detects voltage across input and output sides of the battery;

a power supply unit that supplies power when the standby state determination unit determines that the telephone main unit is in the standby state;

a voltage determination unit that determines whether or not an absolute value of a voltage difference between a first detected voltage detected by the battery voltage detection unit when the standby state determination unit determines that the telephone main unit is in the standby state, and a second detected voltage, detected by the battery voltage detection unit when the standby state determination unit determines that the telephone main unit is in the standby state and when the power supply unit supplies power, exceeds a threshold voltage set based on a voltage when the battery is normally connected;

a warning unit that issues a warning to the effect that power cannot be supplied from the battery when the voltage determination unit determines that the absolute value of the voltage difference exceeds the threshold voltage;

a threshold voltage correction unit that corrects the threshold voltage; and a correction value storage unit that stores the corrected threshold voltage as the threshold voltage.

6. The telephone according to claim 5, wherein the telephone main unit further comprises a remaining amount display unit that displays a remaining power amount of the battery; and the remaining amount display unit displays the remaining power amount of the battery based on the first detected voltage or the second detected voltage detected by the battery voltage detection unit.

* * * * *